Figure 1:
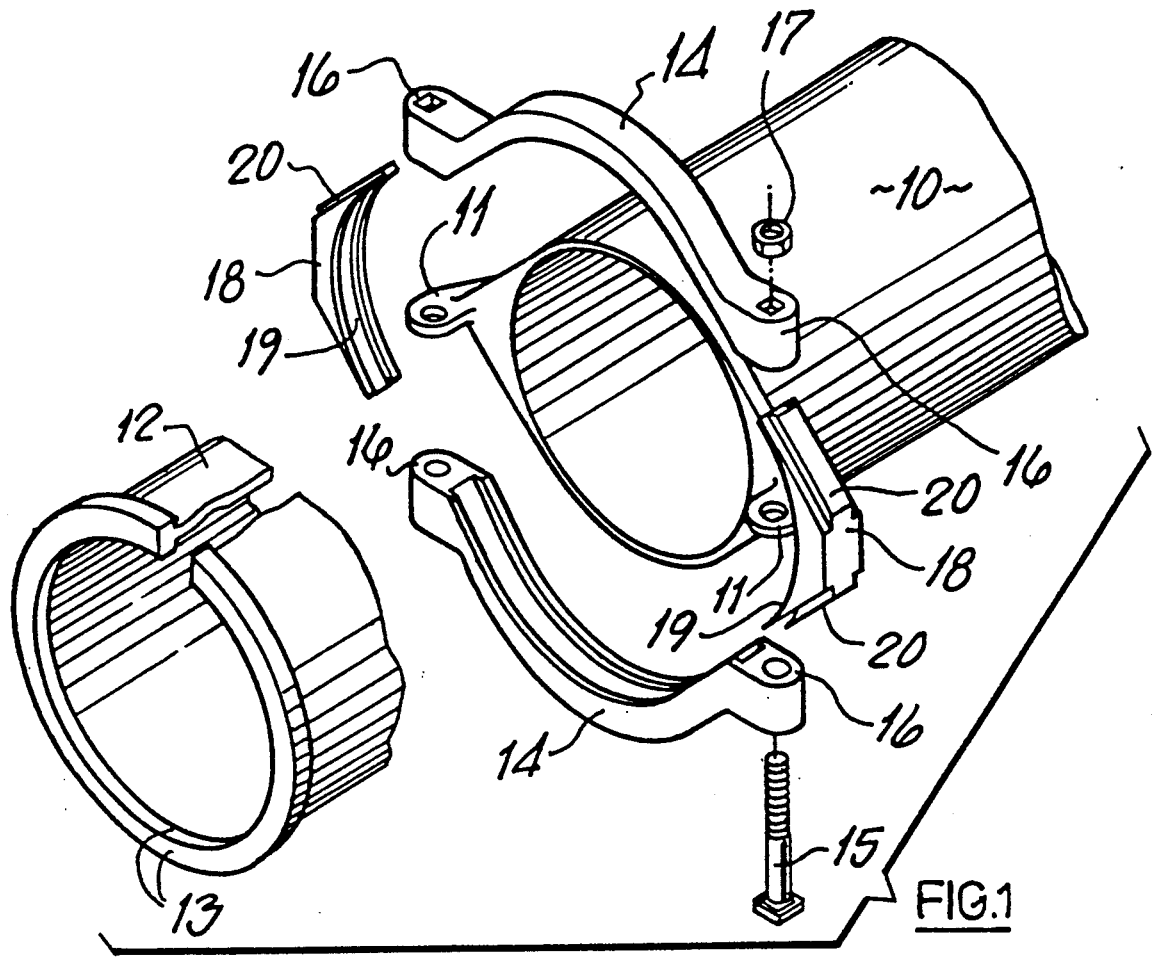

United States Patent [19]
Jardine

[11] Patent Number: 5,037,141
[45] Date of Patent: Aug. 6, 1991

[54] PIPE JOINTING OR CLOSING DEVICE

[75] Inventor: Robert W. Jardine, Stockport, England

[73] Assignee: E. Peart & Company Limited, Cheshire, England

[21] Appl. No.: 186,370

[22] Filed: Feb. 28, 1990

[51] Int. Cl.⁵ ............................................. F16L 25/00
[52] U.S. Cl. ..................................... 285/177; 285/367; 285/369; 285/901; 285/906; 138/89
[58] Field of Search ............... 285/371, 367, 373, 369, 285/901, 906, 237, 236, 177; 138/89

[56] References Cited

U.S. PATENT DOCUMENTS

| | | | |
|---|---|---|---|
| 2,726,681 | 12/1955 | Conroy et al. | 285/236 |
| 3,502,355 | 3/1970 | Demler et al. | 285/177 X |
| 3,958,313 | 5/1976 | Rossborough | 285/237 X |
| 4,417,755 | 11/1983 | Gittleman | 285/373 |
| 4,420,176 | 12/1986 | Cornwell | 285/236 X |
| 4,611,835 | 9/1986 | Gittleman | 285/373 X |

Primary Examiner—Dave W. Arola
Attorney, Agent, or Firm—Nies, Kurz, Bergert & Tamburro

[57] ABSTRACT

A device for jointing or closing pipe ends and comprising a single or double-ended rigid or semi-rigid tubular body (10) adapted to retain and protect a single or double-ended elastomeric sleeve (12) with a resilient annular collar (13) protruding from the body at the or each end. The sleeve (12) surrounds the pipe to be joined or closed, and a clamping ring consisting of a pair of semi-circular segments (14) is closed around the collar (13) with bolts (15) and diametrically opposed wedge-like members (18) which are in sliding engagement with the internal surfaces of the clamping ring segments (14) thus to be forced inwardly together with the latter when the bolts (15) are tightened. This ensures a substantially unform radial compression of the collar (13) around the pipe wall.

12 Claims, 1 Drawing Sheet

PIPE JOINTING OR CLOSING DEVICE

THIS INVENTION relates to a device for jointing or closing ends of pipes such as gas pipes and water pipes. Devices of this kind must be designed to conform very closely with the outer diameter of pipes to be joined or capped thus to ensure a water tight or gas tight seal. They may be fitted to existing underground mains some of which may be 100 years old or more, and it is difficult with conventional devices to ensure that they will always provide an adequate seal. Owing to changing standards, materials, manufacturing techniques and corrosion, pipes of the same nominal diameter can vary widely in actual diameter. Therefore it is desired that the device should be able to accommodate wide variations and differences in pipe diameter.

An object of the invention is to provide such a device in a simple and lightweight construction.

According to the present invention there is provided a device for jointing or closing pipe ends, comprising a substantially rigid tubular body, an elastomeric sleeve located within the body and having at least at one end and protruding axially from the body, a resilient annular collar; a segment clamping ring with means in at least one circumferential position thereon for tightening same around said resilinet collar thus to compress same and force it into sealing engagement with the external wall surface of a pipe inserted into said sleeve; said means engaging a part of the clamping ring and a part of the tubular body for holding the elastomeric sleeve and thus the pipe within the tubular body; and at least one wedge-like member located between the clamping ring and the collar at said at least one position and arranged to slide with respect to the adjacent internal surface of the ring as the latter is tightened thus to force said wedge-like member radially inwards against the resilient collar ensuring a substantially uniform radial compression of the collar around said pipe wall.

Figure 2:
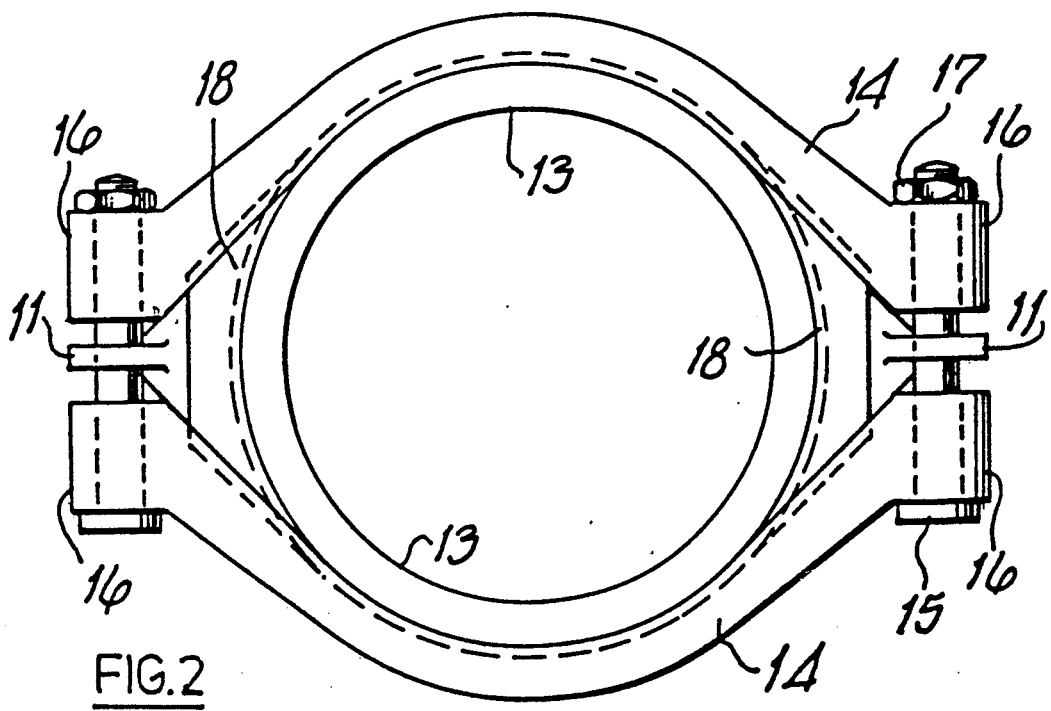

A device made in accordance with the invention will now be described, by way of example, with reference to the accompanying drawings in which:

FIG. 1 is an exploded view of the parts of the device; and FIG. 2 is an end view of the assembled device on a pipe.

The device consists of a rigid or semi-rigid tubular body 10 having at least one end open with a pair of locating lugs 11 extending axially therefrom. Within the body 10 is an elastomeric sleeve 12 which although shown split for the purpose of illustration is preferably of tubular form open only at one or both ends, and having at least at one end an integral resilient collar 13 of increased thickness. Preferably the sleeve 12 is arranged to be a close fit within the body 10, with the collar 13 located close to the end of the body when inserted. It should be noted that this device may form either a two-ended jointing device in which case the body 10 and sleeve 12 are double-ended, or alternatively it may be adapted for capping the end of a pipe in which case the far ends of the body and sleeve as illustrated, will be closed by respective end walls.

Thus, accordingly, at the or each end of the device there is provided a clamping ring which in the embodiment shown consists of a pair of generally semi-circular ring segments 14 generally of channel form to surround and retain a substantial part of the circumference of collar 13.

Clamping bolts 15 pass through lugs 16 of segments 14 and through lugs 11 of body 10 and are tightened by nuts 17.

A pair of wedge-like members 18 having radially inwardly directed arcuate surfaces 19 of similar form to the internal channel formations of segments 14, are located during assembly between the segments 14 and the collar 13 in the regions of the clamping bolts 15 and lugs 16. It will be seen that members 18 have outwardly facing key-way protrusions 20 which locate in the channel formations of the adjacent surfaces of segments 14.

For assembly therefore a pipe end (not shown) is located within sleeve 12 which itself is within body 10. Segments 14 and wedge-like members 18 are located around the collar 13 of sleeve 12 and then bolts 15 and nuts 17 are tightened to draw the segments together, whereupon the protrusions 20 of wedges 18 undergo a generally tangential sliding motion with respect to the internal surfaces of segments 14 such that the wedges 18 move radially inwards ensuring a substantially uniform radial compression of the collar 13 around the entire circumference of the pipe wall.

It will be appreciated that only the internal surface of sleeve 12 will be in direct contact with the fluid within the pipe, whilst the body 10 merely acts as a restraining device (as does the outer wall of a type around an inner tube). This feature is particularly important when the device is used with certain "aggressive" fluids such that they cannot come into contact with any of the relatively moving parts of the device. Furthermore, it is unnecessary to ensure a seal between the outer surface of sleeve 12 and the body, the sleeve itself in a jointing device, forming the coupling.

The substantially uniform tightening provided by the assembly of the device enables it to be used on a wide range of pipe sizes. Indeed, a single such device may be applied to pipes differing by as much as 30 mm in actual diameter.

The sleeve 12 is preferably of nitrile rubber whilst the body 10 may be of metal or a lightweight and inert material such as polypropylene.

The invention is not limited to the above example only. For example, instead of an annular collar 13 at the or each end, the sleeve 12 may be of uniform thickness which should, however, be sufficiently great to accommodate and seal against a range of pipe sizes.

Furthermore, for some applications the wedge-like members 18 may be omitted, and the clamping ring be provided as a continuous band with means to tighten same uniformly around the elastomeric sleeve. Yet again, with the wedge-like members omitted, the clamping ring may consist of three or more arcuate members which when tightened equally, ensure a substantially uniform compression of the sleeve.

What is claimed is

1. A device for jointing or closing pipe ends, comprising a substantially rigid tubular body, an elastomeric sleeve located within the body and having at least one end protruding axially from the body; a clamping ring with means in at least one circumferential position thereon for tightening said clamping ring around the axial protrusion of the sleeve thus to compress said sleeve and force it into sealing engagement with the external wall surface of a pipe inserted into said sleeve; and said means engaging a part of the clamping ring and a part of the tubular body for holding the elastomeric sleeve and thus the pipe within said tubular body.

2. A device according to claim 1, further including at least one wedge-like member located radially between the clamping ring and the axial protrusion of the sleeve in said at least one position and arranged to slide with respect to the adjacent internal surface of the ring as said ring is tightened thus to force said wedge-like member radially inwards against the sleeve ensuring a substantially uniform radial compression thereof around the pipe wall.

3. A device according to claim 2, wherein the axial protrusion of the elastomeric sleeve is formed as a resilient annular collar, and wherein said clamping ring comprises a pair of generally semi-circular ring segments of internal channel form to surround and retain a substantial part of the circumference of the resilient annular collar, there being two diametrically opposed wedge like members between the clamping ring and the resilient annular collar in the adjacent end regions of the ring segments.

4. A device according to claim 3, wherein each wedge like member has a radially inwardly directed arcuate surface of channel form adapted to receive the resilient annular collar of the elastomeric sleeve.

5. A device according to claim 3, wherein each wedge like member includes a pair of outwardly facing key way protrusions which locate in the internal channel formations of the ring segments.

6. A device according to claim 3, wherein said tightening means for said clamping ring comprises at least one pair of opposed apertured lugs on said ring segments and at least one fixing bolt engaged within the apertures.

7. A device according to claim 6, including at least one complementary apertured lug extending axially from at least one end of the tubular body and arranged to be aligned with the apertured lug of the clamping ring thus further to receive the fixing bolt.

8. A device according to any preceding claim for jointing a pair of pipe ends and in which said tubular body is open at both ends and said elastomeric sleeve has, at each end thereof, an axial protrusion, there being a split clamping ring adapted for attachment at each end of the device.

9. A device according to any one of claims 1 to 7, for closing a pipe end, in which said tubular body and elastomeric sleeve have complementary closed ends, the other ends being open and adapted to receive said clamping ring.

10. A device according to any one of claims 1 to 7, in which the tubular body is of metal.

11. A device according to any one of claims 1 to 7, in which said elastomeric sleeve is of nitrile rubber.

12. A device according to any one of claims 1 to 7, in which the tubular body is of polyopropylene.

* * * * *

UNITED STATES PATENT AND TRADEMARK OFFICE
CERTIFICATE OF CORRECTION

PATENT NO. : 5,037,141
DATED : August 6, 1991
INVENTOR(S) : Robert William Jardine It is certified that error appears in the above-identified patent and that said Letters Patent is hereby corrected as shown below:

Item [21], On the title page, the application serial number should read --486,370--.

Column 4, line 27, the word "polyopropylene" should read --polypropylene--.

Signed and Sealed this

Twenty-ninth Day of December, 1992

*Attest:*

DOUGLAS B. COMER

*Attesting Officer*     *Acting Commissioner of Patents and Trademarks*